April 12, 1955    L. D. COBB    2,706,123
DEMOUNTABLE SEAL
Filed Feb. 4, 1950
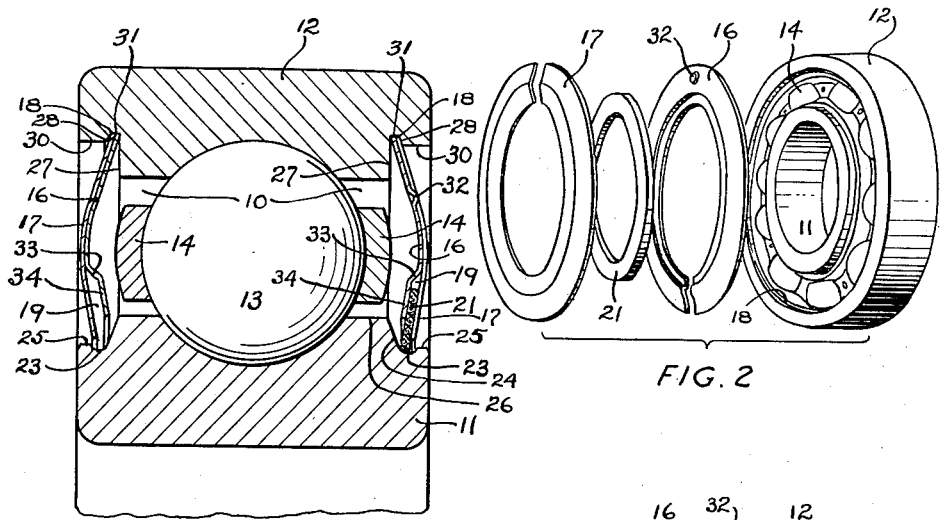
FIG. 1
FIG. 2
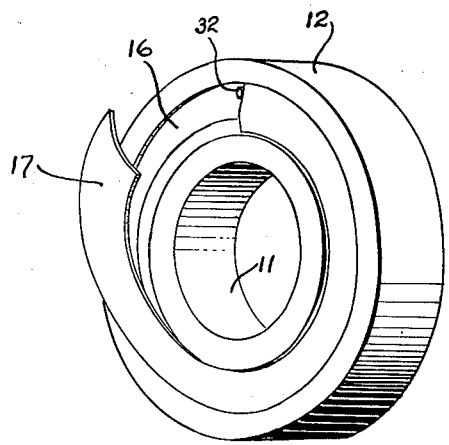
FIG. 3
FIG. 4
INVENTOR;
LELAND D. COBB.
BY Romayn A. Spare
HIS ATTORNEY.

United States Patent Office 2,706,123
Patented Apr. 12, 1955

2,706,123

DEMOUNTABLE SEAL

Leland D. Cobb, Forestville, Conn., assignor to General Motors Corporation, Detroit, Mich., a corporation of Delaware Application February 4, 1950, Serial No. 142,491

2 Claims. (Cl. 286—5)

This invention relates to demountable seals and particularly to an easily demountable seal which will prevent leakage of lubricant from an antifriction bearing and which will also prevent dust and other deleterious materials from entering the bearing.

It is common practice to permanently install in an antifriction bearing a seal or seals which retain lubricant in the bearing for the life of the bearing and which prevent the ingress of dust, water and objectionable materials into the bearing. Usually such a seal has metal parts folded over or otherwise deformed into a tightly wedged unit-handling relation with one of the bearing race rings. This tightly wedged relation frequently distorts one of the race rings to an objectionable out of round condition. Prolonged use of an antifriction bearing under heavy duty and/or at high temperature often causes the lubricant to oxidize and develop a tar-like consistency which impedes the free movement of the rolling elements soon resulting in bearing failure. It is not practical to remove one of these permanently installed seals when it is desired to clean and relubricate a bearing since the seal cannot be removed without damage to itself and frequently, removal of a seal seriously damages the bearing.

An object of this invention is to provide an improved, simply constructed closure or seal for retaining and protecting the lubricant in an antifriction bearing and which may be easily demounted from and replaced in unit-handling relation with the bearing without damage to the seal or to the bearing.

Another object is to provide an improved easily demountable bearing seal having such compact construction that its assembly with an antifriction bearing does not require any increase in bearing length.

A further object is to provide an improved and easily demountable bearing seal having few parts formed from sheet materials and which will maintain an efficient sealing relation between a pair of relatively rotatable bearing members even under conditions of misalignment.

To these ends and also to improve generally upon devices of this character, my invention consists in the various matters hereinafter described and claimed. In its broader aspects, the invention is not necessarily limited to the specific structures selected for illustrative purposes in the accompanying drawings wherein Figure 1 is an enlarged cross sectional view of a portion of an antifriction bearing provided with two related forms of my invention;

Figure 2 is an exploded perspective view showing the parts of the demountable sealing device at the right hand side of Figure 1 and in assembling relation to an antifriction bearing;

Figure 3 is an end elevation showing my demountable seal assembled in unit-handling relation with an antifriction bearing; and Figure 4 is a perspective view showing the method of installing and demounting my seal.

Generally considered, my demountable closure or sealing device closes the end of an annular lubricant chamber 10 between a pair of relatively rotatable members, as antifriction bearing inner and outer race rings 11 and 12, having opposed raceways that cooperatively receive rolling elements, as balls 13, suitably spaced by a separator 14. A pair of demountable generally C-shaped snap rings 16 and 17, having their corresponding edges seated in an annular groove 18 in one of the race rings, extend in lateral engagement with each other and across an end of the lubricant chamber 10 and into closely spaced relation with the other race ring. If desired, an annular channel or groove, as 19, formed between these snap rings, may contain a yieldable sealing washer 21, which extends into lightly wiping sealing contact with this other race ring.

In the illustrations, the antifriction bearing is symmetrical at each side of a vertical plane through the centers of the balls 13. Each end of the inner race ring has a peripheral groove 23 generally arcuate in cross section and extending between a sloping annular shoulder 24, which is preferably frusto-conical and forms an extended side wall of this groove, and a narrow annular slinger portion 25 whose diameter lies intermediate between the bottom of the groove 23 and the cylindrical periphery 26 of the inner race ring 12. The annular groove 18 at each end of the outer race ring 14 opens radially towards the corresponding inner race ring groove 23. A bottom cylindrical wall 31 in each groove 18 laterally extends between a generally radially disposed annular shoulder 27 and a frusto-conical side wall 28 diverging outwardly from the shoulder 27 and terminating in a narrow annular land 30 whose diameter is intermediate between the diameter of the bottom wall 31 and that of the cylindrical inner wall of the outer race ring 14.

Each of the snap rings 16 and 17, which has closely spaced open ends when in mounted position, is formed from thin resilient sheet steel or other suitable material, and when demounted has an outer diameter slightly exceeding the diameter of the bottom wall 31. Both of these snap rings resiliently seat against the bottom groove wall 31 and their combined peripheries preferably extend throughout the width of this bottom wall 31. Also, these resilient snap rings are laterally dished outward and interfit through much of their widths to provide more lubricant space in the chamber 10, to add rigidity to the bearing closure and to yieldably urge the outer snap ring 17 into demountably seated sealing engagement with the outwardly diverging side wall 28 of the groove 18. The inner snap ring 16 is preferably provided with a projection 32 remote from its open ends and which during assembly will locate between the closely spaced open ends of the outer snap ring 17 to prevent adjacent location of both open snap ring ends. Each inner snap ring 16 has an annular stepped portion 33 provided with a wall 34 spaced from and generally parallel to the adjacent wall of the outer snap ring 17 to provide the annular groove or channel 19 that opens into the inner race ring groove 23. These thin snap rings, which cooperatively provide a closure at the end of the lubricant chamber are so compact that my seal can be applied to a standard width antifriction bearing.

When the bearing is charged with a light lubricant which might leak through the small clearance space between the inner race ring 11 and the snap rings, I preferably employ the yieldable sealing washer 21 in the annular groove 19. This sealing washer, which may be of tightly woven felt or of other suitable sealing material substantially impervious to lubricant, radially extends inwardly beyond the snap rings and into lightly wiping sealing contact with the annular shoulder 24 adjacent to and preferably just out of bottoming relation in the groove 23. This sealing washer, which is in slidable sealing engagement with the side walls of the groove 19, has an outer diameter less than that of the bottom of this groove 19 so that in the event of misalignment of the race rings the sealing washer may radially move in its supporting groove and maintain an efficient sealing relation.

In assembly of my demountable closure, the ends of the inner snap ring 16 are temporarily sprung laterally out of alignment. One of these ends is then entered into the bottom of the groove 18 followed by slightly radially and laterally springing the succeeding snap ring portions past the land 30 and into this groove until the entire snap ring periphery is bottomed in this groove with its ends in closely spaced alignment, this snap ring now having a uniform contour and being concentric with the outer race ring. If required, the sealing washer 21 is placed in the annular stepped portion 33. The outer snap ring 17 has one of its ends sprung into the groove 18 against the projection 32 and the succeeding snap ring portions are progressively sprung into the groove 18 in the same manner as was done with the inner snap ring 16, and as shown in Figure 4. My seal has its parts demounted in reverse order. Any suitable sharp nosed tool, as a small screw driver, may be inserted under one end of the outer snap ring to start its removal from the groove 18 and the inner snap ring is removed in the same manner. Due to the resilient character of the snap rings, all of the parts of the seal may be repeatedly removed and replaced without injury and this removal and replacement of the seal is easily accomplished without damage to the bearing. Also, due to the resiliency of the light-weight snap rings, my seal does not produce any race ring distortion.

I claim:

1. A demountable closure means for an end of an annular lubricant chamber between a pair of relatively rotatable inner and outer members, the outer member having an annular groove opening towards the inner member, a cylindrical bottom wall and a sloping side wall in said groove, the inner member having an annular groove opening towards the outer member groove, a frusto-conical wall forming a side of said last mentioned groove, the closure means including a pair of laterally dished snap rings of thin resilient sheet material individually and demountably sprung into laterally abutting seated bottoming relation in the outer member groove and laterally extending in resilient interfitting relation with each other alongside the lubricant chamber, the snap rings cooperatively extending across the bottom of the outer member groove and urging the outer snap ring resiliently into sealing engagement with said sloping wall, a stepped portion on one of the snap rings providing between the snap rings an annular channel radially opening into the inner member groove, and a sealing washer of smaller outside diameter than the bottom of said channel freely movable radially in said channel and sealingly engaging said frusto-conical wall.

2. A demountable closure means for an end of an annular lubricant chamber between a pair of relatively rotatable inner and outer members, the outer member having an annular groove opening towards the inner member, a sloping wall in said groove, the inner member having an annular groove opening towards said other groove, a frusto-conical wall forming a side of the inner member groove, the closure means including a pair of laterally dished snap rings of thin resilient sheet material individually and demountably sprung into adjacent seated bottoming engagement in the outer member groove and laterally extending in dished interfitting relation with each other alongside the lubricant chamber, said snap rings jointly filling the bottom of the outer member groove and urging the outer snap ring into demountably seated sealing engagement with the sloping wall, a pair of closely spaced open ends on each snap ring, projecting means on one snap ring remote from its open ends and arranged to locate between the open ends of the other snap ring, an annular stepped portion on one of the snap rings providing an annular channel between these rings and radially opening into the inner member groove, a yieldable sealing washer of smaller outside diameter than the bottom of said channel radially movable in said channel and sealingly engaging said frusto-conical wall, and said sealing washer located out of bottoming engagement with the inner member groove.

References Cited in the file of this patent

UNITED STATES PATENTS

| | | |
|---|---|---|
| 238,242 | Maxwell | Mar. 1, 1881 |
| 1,460,939 | Boyer | July 3, 1923 |
| 1,478,338 | Isom | Dec. 18, 1923 |
| 1,762,819 | Hughes | June 10, 1930 |
| 1,839,677 | Hodge | Jan. 5, 1932 |
| 1,901,580 | Bott | Mar. 14, 1933 |
| 1,907,023 | Webb | May 2, 1933 |
| 1,956,513 | Neault et al. | Apr. 24, 1934 |
| 2,040,489 | Large | May 12, 1936 |
| 2,186,277 | Tetens | Jan. 9, 1940 |
| 2,202,770 | Brodin | May 28, 1940 |

FOREIGN PATENTS

| | | |
|---|---|---|
| 622,418 | Great Britain | May 2, 1949 |